(12) United States Patent
Hosek et al.

(10) Patent No.: US 10,476,324 B2
(45) Date of Patent: Nov. 12, 2019

(54) HYBRID FIELD ELECTRIC MOTOR

(71) Applicant: Persimmon Technologies Corporation, Wakefield, MA (US)

(72) Inventors: Martin Hosek, Lowell, MA (US); Sripati Sah, Wakefield, MA (US)

(73) Assignee: Persimmon Technologies Corporation, Wakefield, MA (US)

( * ) Notice: Subject to any disclaimer, the term of this patent is extended or adjusted under 35 U.S.C. 154(b) by 164 days.

(21) Appl. No.: 13/799,449

(22) Filed: Mar. 13, 2013

(65) Prior Publication Data

US 2014/0009025 A1 Jan. 9, 2014

Related U.S. Application Data

(60) Provisional application No. 61/668,695, filed on Jul. 6, 2012.

(51) Int. Cl.
| | |
|---|---|
| *H02K 1/02* | (2006.01) |
| *H02K 1/27* | (2006.01) |
| *H02K 21/24* | (2006.01) |
| *H02K 1/20* | (2006.01) |
| *H02K 1/14* | (2006.01) |
| *H02K 21/12* | (2006.01) |
| *H02K 21/14* | (2006.01) |
| *H02K 21/44* | (2006.01) |
| *H02K 1/32* | (2006.01) |
| *H02K 19/10* | (2006.01) |

(52) U.S. Cl.
CPC .............. *H02K 1/2706* (2013.01); *H02K 1/02* (2013.01); *H02K 1/14* (2013.01); *H02K 1/20* (2013.01); *H02K 21/24* (2013.01); *H02K 1/32* (2013.01); *H02K 19/103* (2013.01); *H02K 21/125* (2013.01); *H02K 21/145* (2013.01); *H02K 21/44* (2013.01)

(58) Field of Classification Search
CPC ...... H02K 1/2706; H02K 1/2786; H02K 1/27; H02K 1/02; H02K 1/20; H02K 1/145
USPC .............. 310/216–21, 216.23, 112, 114, 266
See application file for complete search history.

(56) References Cited

U.S. PATENT DOCUMENTS

| | | |
|---|---|---|
| 4,441,043 A | 4/1984 | DeCesare |
| 4,748,361 A * | 5/1988 | Ohnishi et al. .......... 310/156.36 |

(Continued)

FOREIGN PATENT DOCUMENTS

| | | | |
|---|---|---|---|
| DE | 3128220 A1 * | 2/1983 | ............... H02K 1/27 |
| EP | 1868213 A1 | 12/2007 | |
| IE | 020538 A2 | 2/2004 | |

OTHER PUBLICATIONS

Cvetkovski, G., et al., "Performance Improvement of PM Synchronous Motor by Using Soft Magnetic Composite Material", IEEE Transactions on Magnetics, vol. 44, No. 11, pp. 3812-3815, Nov. 2008.

(Continued)

*Primary Examiner* — Thomas Truong
(74) *Attorney, Agent, or Firm* — Harrington & Smith (57) ABSTRACT

A hybrid field electric motor includes a rotor with a rotor core rotating about an axial axis and having a rotor surface with at least one sloping edge face and a radial edge face. The stator includes a stator core and radial pole faces spaced by a gap from the radial edge face of the rotor for radially directing flux into the rotor core. The stator has sloping pole faces spaced from the sloping edge face of the rotor core for flux directed into the rotor core at an angle between radial and axial. The rotor core and/or stator core are made of a soft magnetic composite material for flux in inure than one plane in the core(s).

18 Claims, 9 Drawing Sheets

(56) References Cited

U.S. PATENT DOCUMENTS

| | | | |
|---|---|---|---|
| 5,102,620 | A | 4/1992 | Watson et al. |
| 5,225,004 | A | 7/1993 | O'Handley et al. |
| 5,266,098 | A | 11/1993 | Chun et al. |
| 5,350,628 | A | 9/1994 | Kugimiya et al. |
| 5,834,865 | A | 11/1998 | Sugiura |
| 5,898,253 | A | 4/1999 | El-Antably et al. |
| 5,936,325 | A | 8/1999 | Permuy |
| 5,942,828 | A * | 8/1999 | Hill .............................. 310/164 |
| 5,952,756 | A | 9/1999 | Hsu et al. |
| 6,511,718 | B1 | 1/2003 | Paz de Araujo et al. |
| 6,661,151 | B2 | 12/2003 | Tan et al. |
| 6,700,271 | B2 | 3/2004 | Detela |
| 6,707,224 | B1 | 3/2004 | Petersen |
| 6,750,588 | B1 | 6/2004 | Gabrys |
| 6,762,525 | B1 | 7/2004 | Maslov et al. |
| 6,830,057 | B2 | 12/2004 | Dolechek et al. |
| 6,882,066 | B2 | 4/2005 | Kastinger |
| 6,891,306 | B1 | 5/2005 | Soghormonian et al. |
| 6,919,543 | B2 | 7/2005 | Abbott et al. |
| 6,946,771 | B2 | 9/2005 | Cros et al. |
| 7,034,422 | B2 | 4/2006 | Ramu |
| 7,061,152 | B2 | 6/2006 | Petro et al. |
| 7,155,804 | B2 | 1/2007 | Calico |
| 7,205,697 | B2 | 4/2007 | Rhyu et al. |
| 7,208,787 | B2 | 4/2007 | Manabe |
| 7,557,480 | B2 | 7/2009 | Filatov |
| 7,579,744 | B2 * | 8/2009 | Kato .............................. 310/268 |
| 7,635,932 | B2 * | 12/2009 | Matin et al. ..................... 310/58 |
| 7,712,982 | B2 * | 5/2010 | Akiba .................... G03B 17/00 310/156.38 |
| 7,830,057 | B2 | 11/2010 | Gieras |
| 7,952,252 | B2 | 5/2011 | Kang et al. |
| 8,053,944 | B2 | 11/2011 | Calley et al. |
| 2004/0007790 | A1 | 1/2004 | Kato et al. |
| 2004/0150289 | A1 * | 8/2004 | James ........................... 310/261 |
| 2005/0056347 | A1 | 3/2005 | Takaya et al. |
| 2006/0013962 | A1 | 1/2006 | Fuller et al. |
| 2006/0038450 | A1 * | 2/2006 | Matin ...................... H02K 9/20 310/58 |
| 2006/0087186 | A1 * | 4/2006 | Wasson ................... H02K 1/14 310/114 |
| 2006/0124464 | A1 | 6/2006 | Lemieux |
| 2006/0138890 | A1 * | 6/2006 | Kato ........................ 310/156.35 |
| 2007/0035197 | A1 * | 2/2007 | Usui ..................... H02K 1/187 310/257 |
| 2007/0222325 | A1 * | 9/2007 | Caamano ............... H02K 21/22 310/216.023 |
| 2008/0029300 | A1 | 2/2008 | Harada et al. |
| 2008/0231409 | A1 | 9/2008 | Kugai et al. |
| 2008/0278020 | A1 * | 11/2008 | Ley ........................ H02K 1/148 310/156.36 |
| 2008/0278022 | A1 | 11/2008 | Burch et al. |
| 2009/0001831 | A1 | 1/2009 | Cho et al. |
| 2010/0109453 | A1 * | 5/2010 | Calley et al. ................... 310/46 |
| 2011/0163618 | A1 | 7/2011 | Kanazawa et al. |
| 2011/0316386 | A1 * | 12/2011 | Karakaya et al. ............ 310/318 |
| 2013/0000447 | A1 | 1/2013 | Hosek et al. |
| 2013/0000860 | A1 | 1/2013 | Hosek et al. |
| 2013/0000861 | A1 | 1/2013 | Hosek et al. |
| 2013/0002085 | A1 | 1/2013 | Hosek et al. |
| 2013/0004359 | A1 | 1/2013 | Hosek |
| 2013/0292081 | A1 | 11/2013 | Hosek et al. |

OTHER PUBLICATIONS

Hur, J. et al., "Development of High-efficiency 42V Cooling Fan Motor for Hybrid Electric Vehicle Applications", IEEE Vehicle Power and Propulsion Conference, Windsor, UK, 2006, 6 pgs. (unnumbered).

Jack, A.G. et al., "Combined Radial and Axial Permanent Magnet Motors Using Soft Magnetic Composites", Ninth International Conference on Electrical Machines and Drives, Conference Publication No. 468, pp. 25-29, IEE, 1999.

Jack et al., "Permanent-Magnet Machines with Powdered Iron Cores and Prepressed Windings", IEEE Transactions on Industry Applications, vol. 36, No. 4, Jul./Aug. 2000, pp. 1077-1084.

Roy, S., et al., "Nucleation Kinetics and Microstructure Evolution of Traveling ASTM F75 Droplets", Advanced Engineering Materials, vol. 12, No. 9, pp. 912-919, 2010.

Uozumi et al., "Properties of Soft Magnetic Composite with Evaporated MgO Insulation Coating for Low Iron Loss", Materials Science Forum, vols. 534-536, 2007, pp. 1361-1364.

Written Opinion of the International Searching Authority for International Application No. PCT/US2012/000306, Sep. 28, 2012, 13 pgs. (unnumbered).

Written Opinion of the International Searching Authority for International Application No. PCT/US2012/000307, Sep. 7, 2012, 7 pgs. (unnumbered).

J.R. Davis, Ed., "Cold Spray Process", Handbook of Thermal Spray Technology, ASM International and the Thermal Spray Society, 2004, pp. 77-84.

Brunckova et al., "The Effect of Iron Phosphate, Alumina and Silica Coatings on the Morphology of Carbonyl Iron Particles", Surface and Interface Analysis, De. 2009, pp. 13-20.

Borisov et al., "Electric and Magnetic Properties of Thermal Spray Coatings With an Amorphous Structure", Proceedings of the 15$^{th}$ International Thermal Spray Conference, May 25-29, 1998, Nice, France, pp. 687-691.

Liu et al., "Highly Stable Alumina-Coated Iron Nanocomposites Synthesized by Wet Chemistry Method", Surface & Coatings Technology 200 (2006), pp. 5170-5174.

Hanson et al., "Independent Control of HVOF Particle Velocity and Temperature", Journal of Thermal Spray Technology, ASM International, vol. 11(1), Mar. 2002, pp. 75-85.

Cherigui et al., "Microstructure and Magnetic Properties of Fe—Si-Based Coatings Produced by HVOF Thermal Spraying Process", Journal of Alloys and Compounds, 427 (2007), pp. 281-290.

Kolman et al., "Modeling of Oxidation During Plasma Spraying of Iron Particles", Plasma Chemistry and Plasma Processing, vol. 22, No. 3, Sep. 2002, pp. 437-450.

Wank et al., "Nanocoating Individual Cohesive Boron Nitride Particles in a Fluidized Bed by ALD", Powder Technology, 142 (2004), pp. 59-69.

Hoile et al., "Oxide Formation in the Sprayform Tool Process", Materials Science & Engineering, A 383 (2004), pp. 50-57.

Newbery et al., "Oxidation During Electric Arc Spray Forming of Steel", Journal of Materials Processing Technology, 178 (2006), pp. 259-269.

Neiser et al., "Oxidation in Wire HVOF-Sprayed Steel", Journal of Thermal Spray Technology, ASM International, vol. 7(4), Dec. 1998, pp. 537-545.

Ageorges et al., "Plasma Spraying of Stainless-Steel Particles Coating with an Alumina Shell", Thin Solid Films, 370 (2000), pp. 213-222.

Sugaya et al., "Soft Magnetic Properties of Nano-Structure-Controlled Magnetic Materials", IEEE Transactions on Magnetics, vol. 31, No. 3, May 1995, pp. 2197-2199.

Cherigui et al., "Studies of Magnetic Properties of Iron-Based Coatings Produced by a High-Velocity Oxy-Fuel Process", Materials Chemistry and Physics, 92 (2005), pp. 419-423.

Shafrir et al., "Zirconia-Coated-Carbonyl-Iron-Particle-Based Magnetorheological Fluid for Polishing Optical Glasses and Ceramics", LLE Review, vol. 120, 2009, pp. 190-205.

Written Opinion of the International Searching Authority for International Application No. PCT/US14/58291, dated Feb. 24, 2015, 6 pgs.

* cited by examiner

HYBRID FIELD ELECTRIC MOTOR

RELATED APPLICATIONS

This application claims benefit of and priority to U.S. Provisional Application Ser. No. 61/668,695 filed Jul. 6, 2012 under 35 U.S.C. §§ 119, 120, 363, 365, and 37 C.F.R. § 1.55 and § 1.78 and is incorporated herein by this reference.

GOVERNMENT RIGHTS

This invention was made with Government support under SBIR Phase I Grant Number 1113202 awarded by the National Science Foundation. The Government has certain rights in this invention.

FIELD OF THE INVENTION

The present embodiment relates to electric motors and, more particularly, to hybrid field electric motors.

BACKGROUND OF THE INVENTION

Various types of electric motors have been devised for rotary and linear applications. Such motors typically have a rotor and a stator where one or both of the rotor and stator are fabricated using laminated sheets of magnetic material or laminations in order to reduce eddy current losses. As such, motor topologies are typically limited, for example, to rotary flux type electrical machines that direct the magnetic flux in a path that is planar with respect to the laminations where the laminations may be flat or a ribbon type core. Materials, for example, powder metal, are being developed that are formed from particles of magnetic material with an insulation barrier between the particles. With such materials, the flux need not be directed in a plane as the material has magnetic properties that are isotropic. By way of example, claw pole structure such as disclosed in U.S. Pat. No. 6,946,771 takes advantage of such isotropic properties. There is a desire to maximize efficiency and output of such motors while minimizing cost and size.

SUMMARY OF THE INVENTION

In one aspect of the disclosed embodiment, an electric motor is provided. The motor has a rotor and a stator. The rotor has a soft magnetic core and one or more permanent magnets. The stator has a soft magnetic core and one or more windings. Magnetic flux is directed by the core of the stator in an axial and a radial direction through the magnets and the core of the rotor.

In another aspect of the disclosed embodiment, the stator has first and second separable core portions, each core portion directing the magnetic flux axially in opposite directions with respect to the stator.

In another aspect of the disclosed embodiment, the stator has cooling passages integrally formed within the soft magnetic core.

In another aspect of the disclosed embodiment, the stator has cooling passages integrally formed within teeth of the soft magnetic core.

In another aspect of the disclosed embodiment the motor is a brushless motor.

In another aspect of the disclosed embodiment, the motor is a transverse flux motor.

In another aspect of the disclosed embodiment, the stator has a claw pole structure.

In another aspect of the disclosed embodiment, the rotor is provided without permanent magnets and the stator is provided with permanent magnets.

In another aspect of the disclosed embodiment, the stator has at least two segments, each segment having a separate winding.

Featured is a hybrid field electric motor comprising a rotor with a rotor core rotating about an axial axis and having a rotor surface with at least one sloping edge face and a radial edge face. The stator includes a stator core and radial pole faces spaced by a gap from the radial edge face of the rotor for radially directing flux into the rotor core. The stator further includes sloping pole faces spaced from the sloping edge face of the rotor core for flux directed into the rotor core at an angle between radial and axial. The rotor core and/or stator core are made of a soft magnetic composite material for flux in more than one plane in said core(s).

The rotor may be inside the stator and then the rotor surface with at least one sloping edge face and a radial edge face are on an outer periphery of the rotor. In other designs, the stator is inside the rotor and then the rotor surface with at least one sloping edge face and a radial edge face are on an inner periphery of the rotor. The rotor may include a permanent magnet on said sloping edge face and said radial edge face. In some designs, the rotor includes a sloping edge face on opposite sides of the radial edge face and the stator includes a sloping pole face for each sloping edge face of the rotor core. Preferably the stator radial pole faces are offset from the core so the stator can include windings configured as a salient pole hybrid field motor or windings configured as a distributed pole hybrid field motor.

The motor may further include cooling channels integrally formed within the soft magnet composite material. In some designs, the motor defines a plurality of magnetic circuits each having more than one winding.

Also featured is a hybrid field electric motor comprising a rotor with a rotor core rotating about an axial axis and having a rotor surface with at least one sloping edge face and a radial edge face. The stator includes a stator core and radial pole faces spaced by a gap from the radial edge face of the rotor for radially directing flux into the rotor core. The stator further includes sloping pole faces spaced from the sloping edge face of the rotor core for flux directed into the rotor core at an angle between radial and axial. The rotor core and/or stator core are preferably made of a soft magnetic composite material for flux in more than one plane in said core(s). One or more cooling channels are formed in the soft magnetic composite material.

Also featured is a hybrid field electric motor comprising a rotor with a rotor core rotating about an axial axis and having a rotor surface with at least one sloping edge face and a radial edge face. The stator includes a stator core and radial pole faces spaced by a gap from the radial edge face of the rotor for radially directing flux into the rotor core. The stator further includes sloping pole faces spaced from the sloping edge face of the rotor core for flux directed into the rotor core at an angle between radial and axial. The rotor core and/or stator core are made of a soft magnetic composite material for flux in more than one plane in said core(s). A plurality of magnetic circuits each have more than one winding.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

The foregoing aspects and other features of the present embodiment are explained in the following description, taken in connection with the accompanying drawings, wherein.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Aside from the embodiment disclosed below, the disclosed embodiment is capable of other embodiments and of being practiced or being carried out in various ways. Thus, it is to be understood that the disclosed embodiment is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1A:
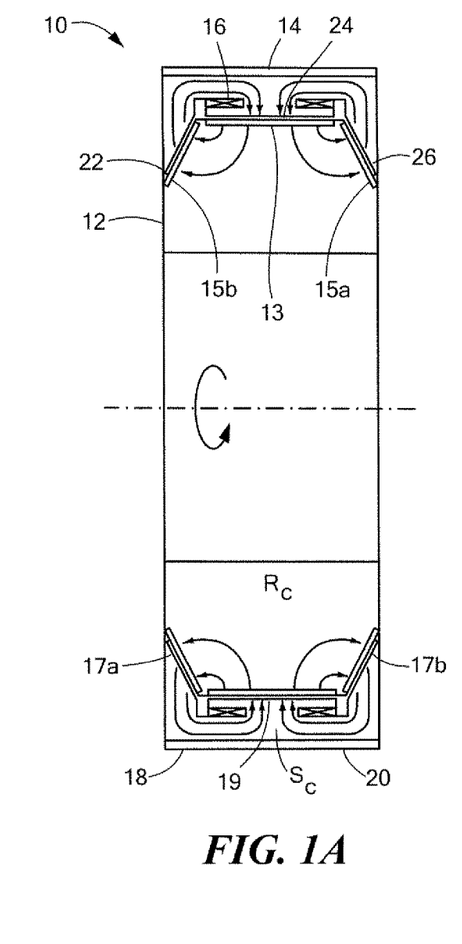
FIG. 1A is a cross sectional view of a salient pole hybrid field motor in accordance with an example of the invention.
Figure 1B:
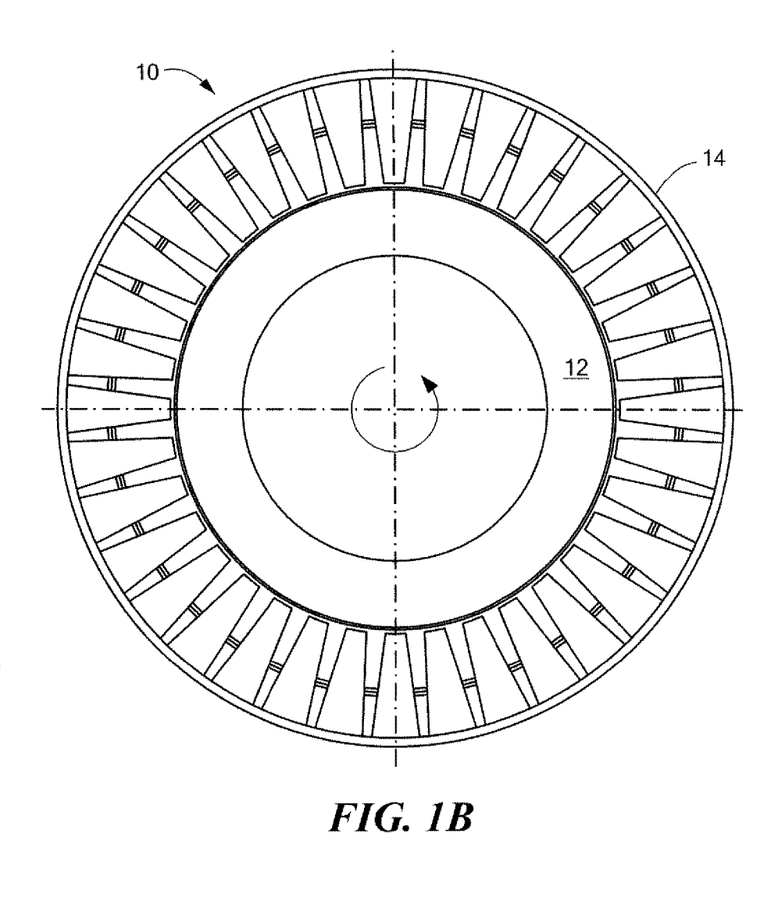
FIG. 1B is a top view of the salient pole hybrid field motor of FIG. 1A.

Referring now to FIG. 1A, there is shown a cross section of a salient pole hybrid field motor 10. Referring also to FIG. 1B, there is shown a top view of a salient pole hybrid field motor 10. Motor 10 may utilize soft magnetic composite materials instead of laminated sheets. Alternately and further, the soft magnetic material may have features as used with respect to soft magnetic composites (SMC) such as powder metal or sintered cores or other suitable soft magnetic material. Such SMC features may include substantially isotropic magnetic behavior, low eddy current losses, and isotropic thermal conductivity or otherwise. Traditional electric motor topologies were developed with a focus on laminated electrical steels are unable to fully leverage the properties of soft magnetic composites to achieve improved motor performance. In one disclosed embodiment, several motor topologies that utilize SMC materials are disclosed. These hybrid field motor topologies utilize 3D flux paths through the motor core to achieve improved performance over laminated counterparts.

FIG. 1 illustrates a salient pole permanent magnet brushless DC motor with three dimensional flux paths. Motor 10 has rotor 12 and stator 14. In the embodiment shown, stator 14 and/or rotor 12 may be split or segmented on any plane, for example, a plane with zero flux crossing or otherwise. Rotor core $R_c$ and/or stator core $S_c$ may be made of SMC materials. Stator 14 has windings 16 with a single winding per slot. Stator 14 may have first 18 and second 20 portions that may be joined prior to the installation of windings 16. Alternately, stator 14 may be split in two halves, for example, along one of the two dashed lines shown in FIG. 1B. Alternately, each salient pole of stator 14 may be segmented and fabricated individually where each salient pole is separate.

Figure 1C:
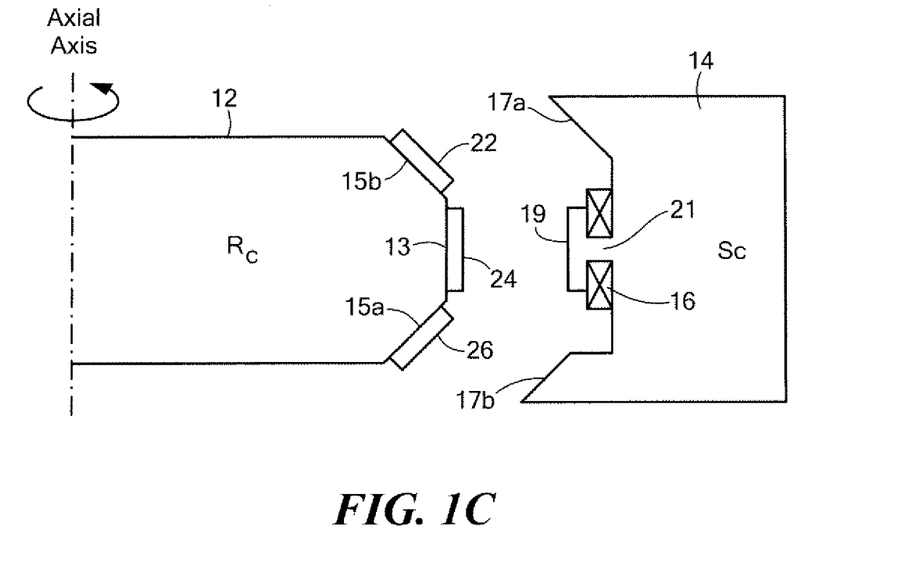
FIG. 1C is a cross sectional front view of the motor of FIGS. 1A-1B.

Unlike most conventional motors which have cylindrical ends, the motor topology shown has a rotor 12 with magnets 22, 24, 26 and a conical end with sloping edge faces. The motor utilizes a combination of radial and axial flux to generate torque. Rotor magnets on the radial edge face 13 and sloping edge faces 15a, 15b direct the flux normal through the air gaps into the stator, the flux then interacts with the field generated by the copper winding. Since the flux in the stator has both radial and axial components it may be constructed using a magnetic material with isotropic properties. As a result of this configuration the magnet-stator interaction area is increased as compared to a radial only or axial only counterpart and leads to higher specific output. The stator also includes sloping pole faces 17a, 17b and radial pole face 19, FIG. 1C. Radial pole face 19 may be offset from stator core $S_c$ as shown by stem portion 21.

Figure 2A:
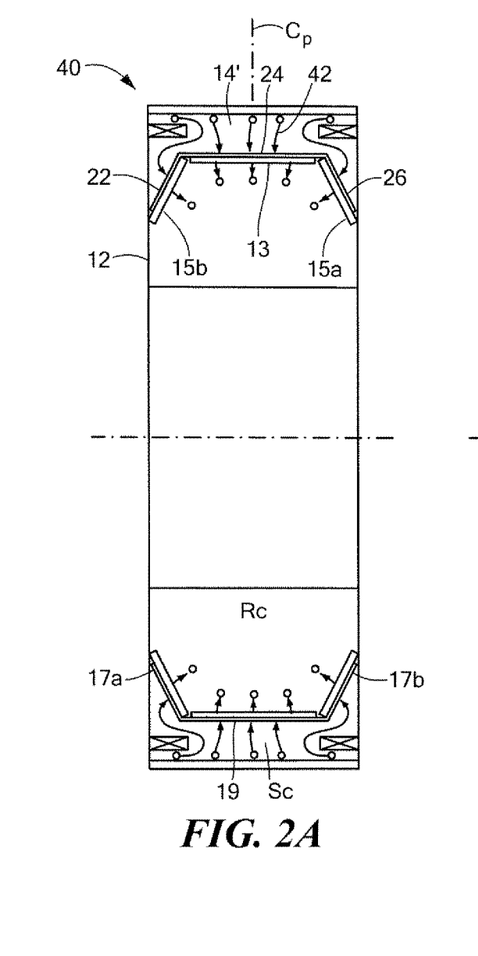
FIG. 2A is a cross sectional view of a distributed pole hybrid field motor in accordance with an example of the invention.
Figure 2B:
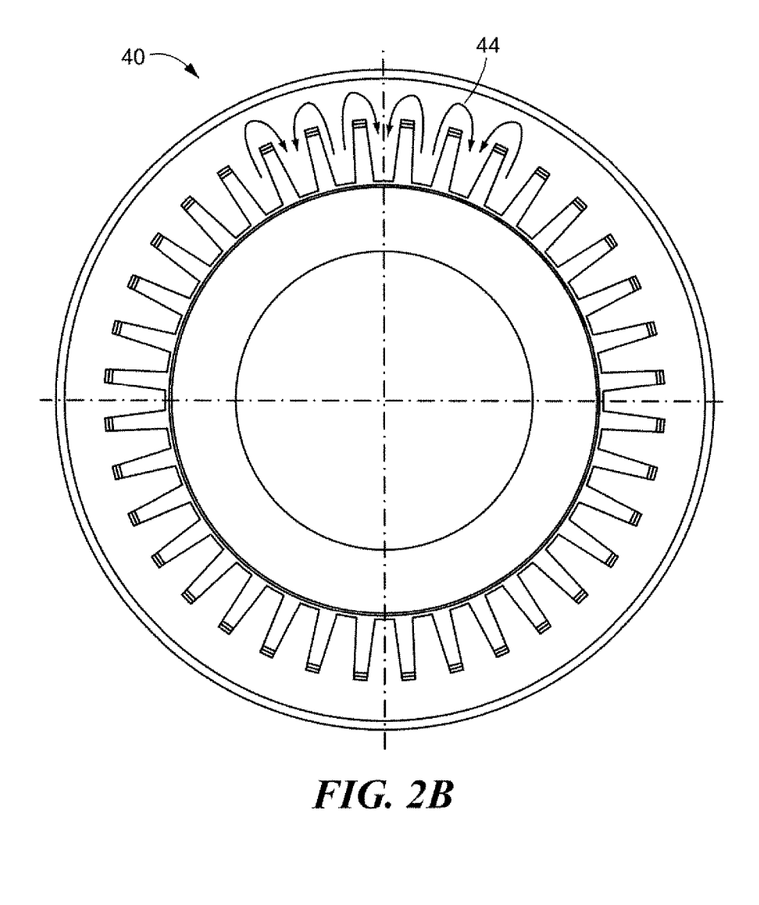
FIG. 2B is a top view of the distributed pole hybrid field motor of FIG. 2A.

Referring now to FIG. 2A, there is shown a cross section of a distributed pole hybrid field motor 40. Referring also to FIG. 2B, there is shown a top view of a distributed pole hybrid field motor 40. Here, a distributed winding permanent magnet brushless DC motor with three dimensional flux path is illustrated. Alternately, a salient pole winding or hybrid salient/distributed winding may be provided. Similar to the motor shown in FIGS. 1A, 1B, and 1C, this motor topology also features conical ends with sloping edges and utilizes a combination of radial and axial flux to generate torque. The difference lies in the construction of the stator and the layout of the copper winding. In the distributed winding configuration a single copper winding phase is distributed over several poles thus coupling the flux between adjacent stator pole pairs. This flux coupling 42, 44 is shown illustrated in FIGS. 2A and 2B. A salient feature of this topology is that the flux distribution is symmetric about the central plane of the motor $C_p$. This allows the stator 14' to be constructed in two or more pieces that split stator 14' along plane C$_p$ and be assembled using pre-wound copper coils without introducing any flux loss related performance degradation. In alternate aspects any suitable winding material or geometry may be provided.

Figure 3A:
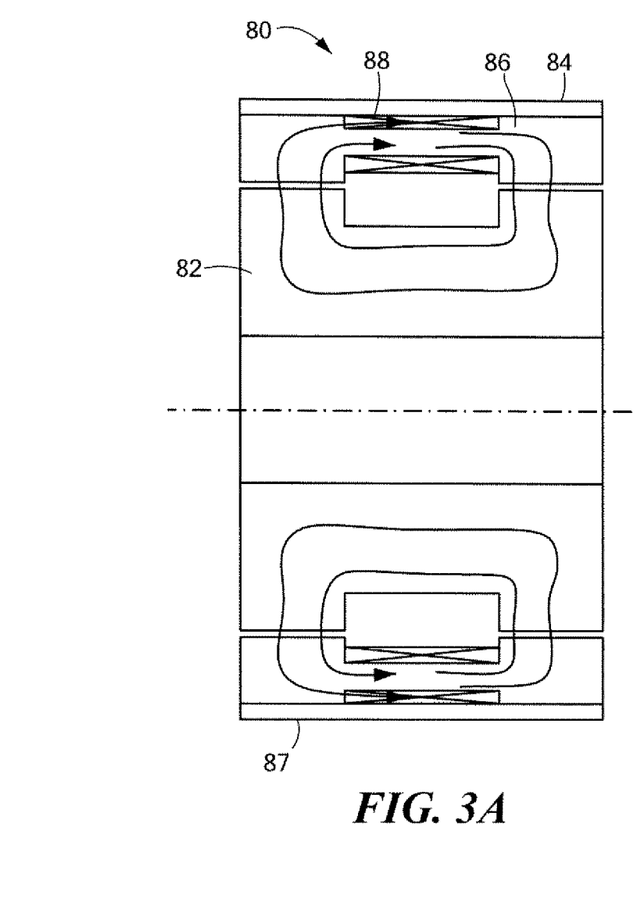
FIG. 3A is a cross sectional view of a variable reluctance hybrid field motor in accordance with another example.
Figure 3B:
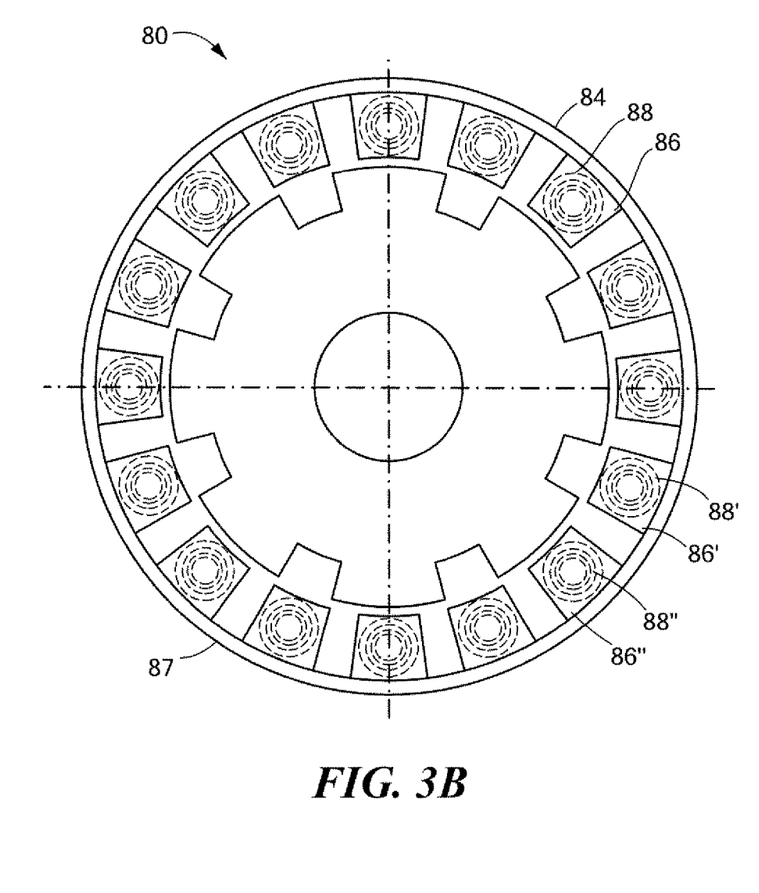
FIG. 3B is a top view of the variable reluctance hybrid field motor of FIG. 3A.

Referring now to FIG. 3A, there is shown a cross section of a variable reluctance hybrid field motor 80. Referring also to FIG. 3B, there is shown a top view of a variable reluctance hybrid field motor 80. Here, a variable reluctance brushless DC motor with three dimensional flux paths is illustrated. Motor 80 has solid core rotor 82 and stator 84. Stator 84 has core 86 and windings 88 and cover or ring 87. Unlike traditional reluctance motors which close the magnetic path in adjacent stator teeth this motor topology closes the loop within the same stator tooth by directing the flux in the axial direction. This allows the use of prepressed windings reducing motor costs while the reduced length of the net magnetic path improves the motor performance. Here, individual winding and stator portions (86', 88'; 86", 88" . . . ) may be provided bonded to ring 87 to form motor 80.

Figure 4A:
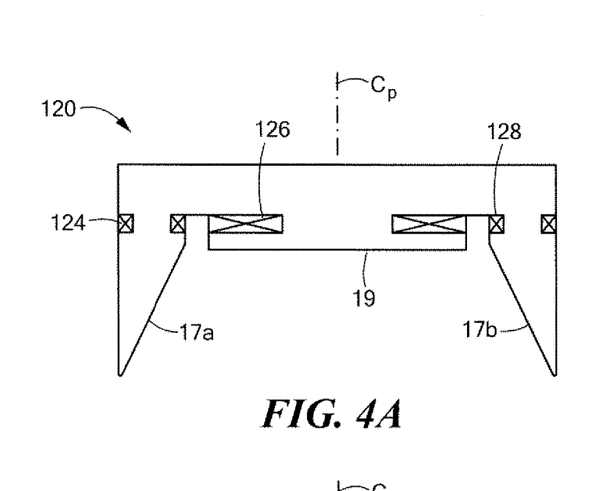
FIG. 4A is a cross sectional view of an exemplary stator.
Figure 4B:
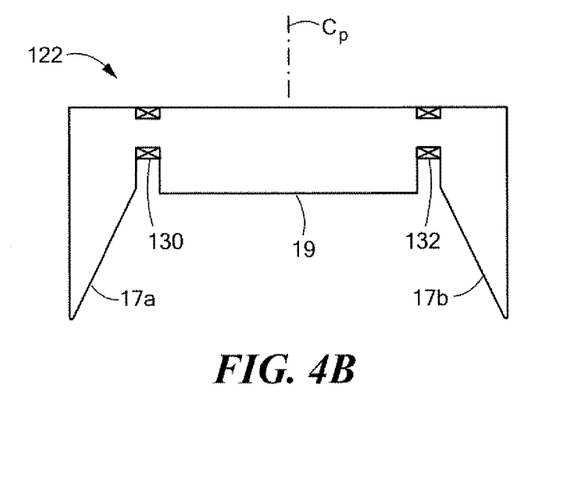
FIG. 4B is a cross sectional view of another stator.

Referring now to FIGS. 4A and 4B, there is shown a cross section of stator 120, 122 which may have features as in FIG. 1. Stator 120 has radial flux windings 124, 126 and 128. Stator 122 has axial flux windings 130, 132. Here, the windings may be salient, distributed or otherwise. The motor topologies may be further enhanced to improve motor performance and/or reduce manufacturing costs. Some such enhancements include a winding arrangement where the copper winding on the stator teeth may be split and rearranged into smaller coils located closer to the rotor-stator air gap decreasing flux losses and copper costs while evenly distributing the thermal loads on the structure. Some such possibilities are illustrated in FIGS. 4A and 4B. As seen in FIG. 4A stator 122, 120 may be split along radial plane C$_p$.

Figure 5A:
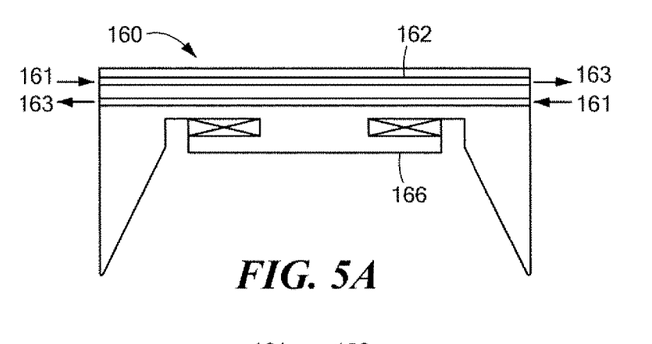
FIG. 5A is a cross sectional view of another stator.
Figure 5B:
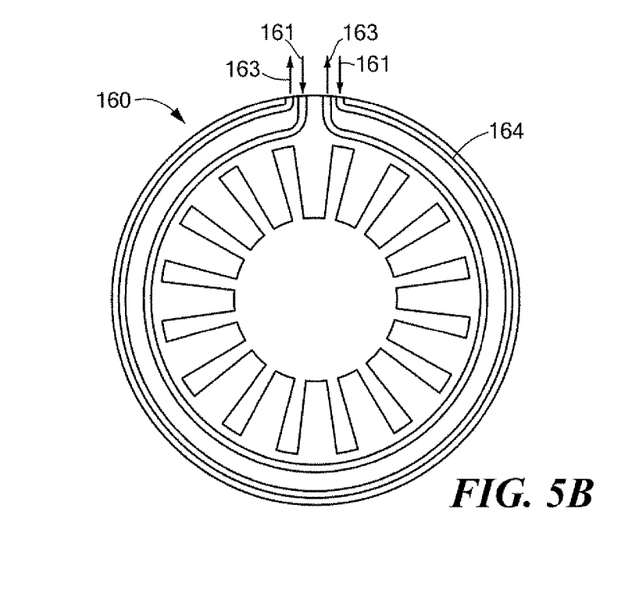
FIG. 5B is a top view of the stator of FIG. 5A.

Referring now to FIG. 5A, there is shown a cross section of a stator 160. Referring also to FIG. 5B, there is shown a top view of a stator 160. Stator 160 is shown having axial cooling channels 162 and radial cooling channels 164 having inlets 161, and outlets 163. The channels may be provided to allow a fluid or gas to pass through stator 160. Although channels 162, 164 are as shown, alternately any suitable combination of channels may be provided. For example, a channel may be provided within tooth 166 such that the cooling fluid in channel 162 is in communication with channel 164. As further example, a helical radial pattern may be provided through the core. As a further example, multiple fluid channels may be provided radially, axially or in any suitable location, orientation or otherwise. As a further example, fluid channels or cooling passages may be provided and built into the core to take advantage of flux symmetries, in plane with zero flux crossing or in line with flux path(s) or otherwise. Here, motor topologies may be further enhanced to improve motor performance and/or reduce manufacturing costs. Some such enhancements include thermal management. Here, a limitation on the power output of conventional motors is the heating of the stator core. The use of SMC materials in constructing motor cores allows the inclusion of cooling channels within the core during the manufacturing operation, for example, as illustrated in FIGS. 5A and 5B. See also U.S. patent application Ser. No. 13/507,450.

Figure 6:
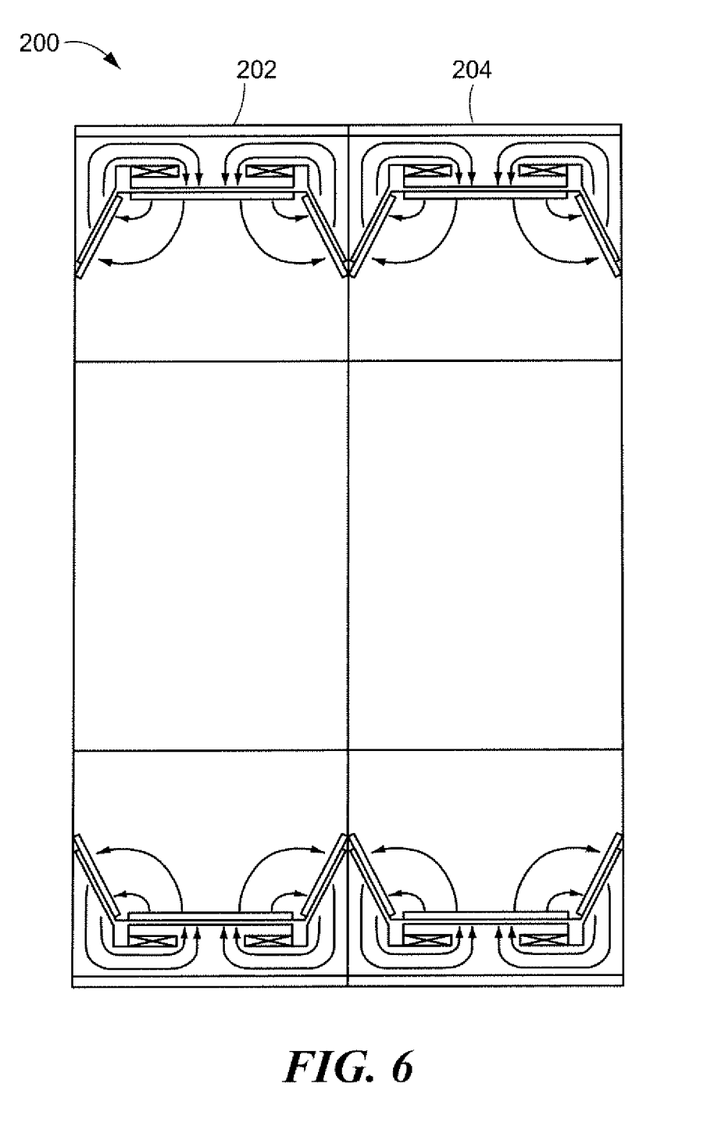
FIG. 6 is a cross sectional view of an electric motor with stacked stators and rotors in accordance with examples of the invention.

Referring now to FIG. 6, there is shown a cross section of an electric motor 200. Here, the motor topologies may be further enhanced to improve motor performance and/or reduce manufacturing costs. Some such enhancements include stacking motors 202 and 204 and coupling their respective rotors and stators. Here a topology configuration may be provided that increases the magnet-stator interaction area significantly where this modification leads to higher motor output and may be two independent phases or more.

Figure 7A:
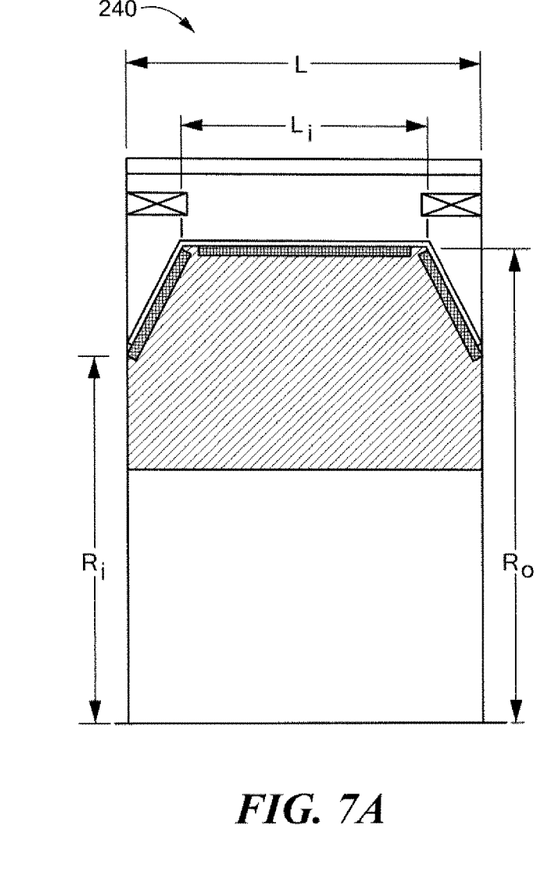
FIG. 7A is a cross sectional view of a portion of the electric motor of FIG. 1A.
Figure 7B:
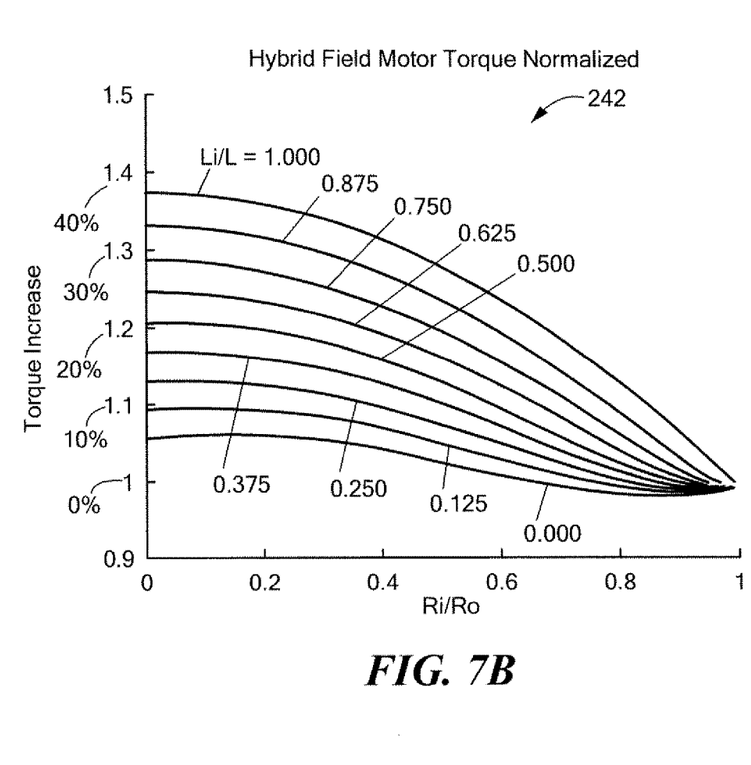
FIG. 7B is a performance graph for the motor of FIG. 7A.

Referring now to FIG. 7A, there is shown a cross section of an electric motor 240. Referring also to FIG. 7B, there is shown a performance graph 242. The performance of the hybrid field motor topologies has been evaluated through Finite Element simulations and extrapolated for different geometries under the assumption of a constant magnetic force per unit length. The geometry of the hybrid field motor is illustrated in FIG. 7A, the cone radius (Ri) and cylinder length (Li) for the hybrid field control the additional magnet area on the conical surface. As Ri is made smaller or Li is made larger the conical area increases increase torque production, this is confirmed by the modeling results illustrated in FIG. 7B. It is noted that in practice the triangular region on the stator ends should not be made very small as torque generation will be limited by local magnetic saturation on the core material. It can be seen from FIG. 7b that the Hybrid Field motor can produce, in theory, an additional 38% torque over a similarly sized motor with conventional topology. In practice due to saturation effects the actual improvement may be limited to about 25% which still represents a substantial improvement. Alternately, more or less improvement may be provided.

Figure 8:
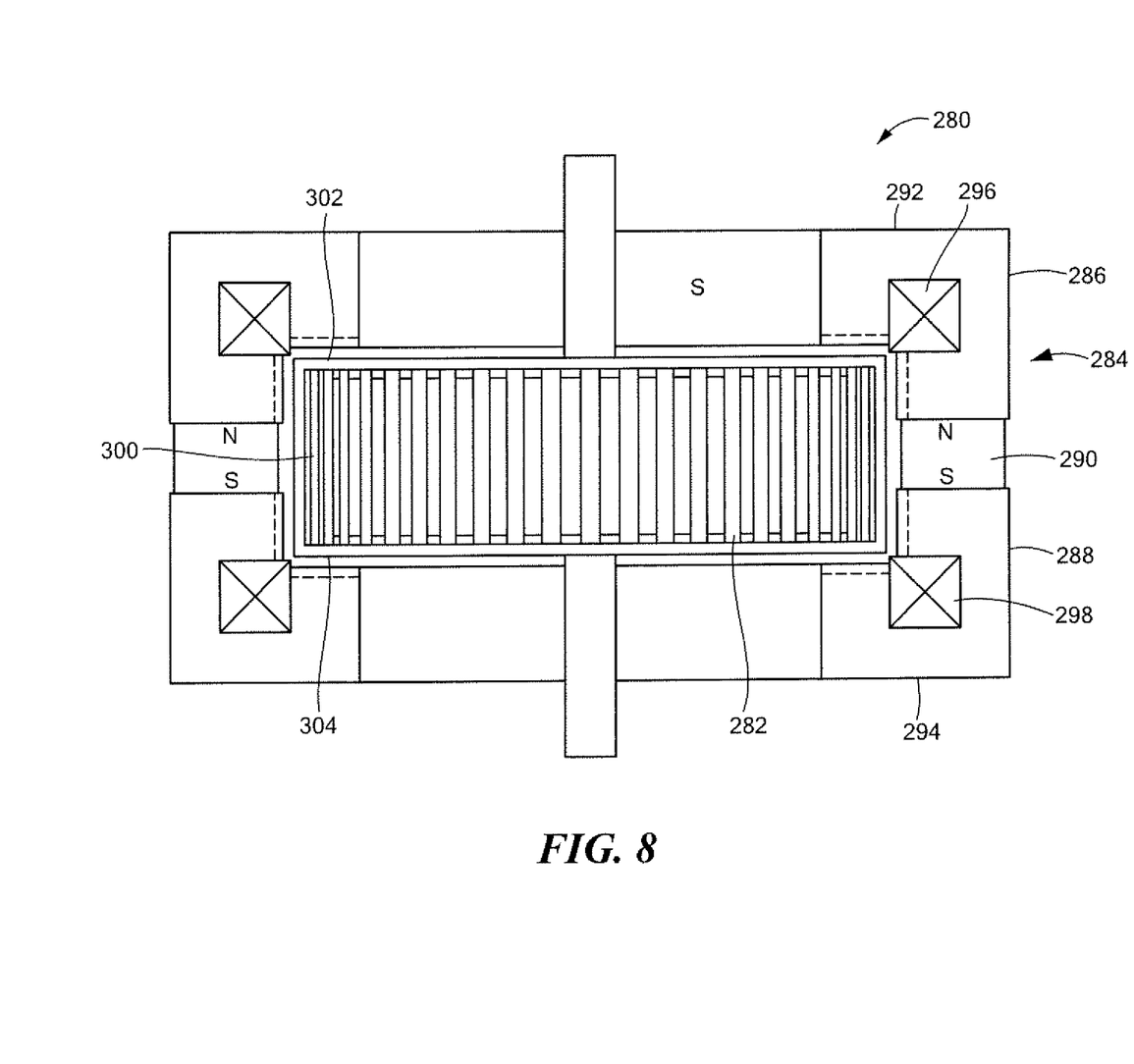
FIG. 8 is a cross sectional view of another electric motor.

Referring now to FIG. 8, there is shown a cross section of a variable reluctance electric motor 280. Motor 280 has solid core, for example SMC or other solid core material, toothed rotor 282 and stator 284. Stator 284 has first and second toothed stator 286, 288 and ring magnet 290. Each toothed stator has a toothed core 292, 294 and spool winding 296, 298. Rotor 282 has both radial 300 MO and axial 302, 304 teeth opposing teeth on stators 286, 288 where the teeth on stators 286, 288 are respectively phased 90 degrees or otherwise. In alternate aspects, a magnet may be provided within rotor 282, for example, to provide an axial flux. Here, stators 286, 288 would not need to be phased with respect to each other and magnet 290 may not be provided. In alternate aspects, no magnet may be provided, for example as in a variable reluctance motor.

Figure 9:
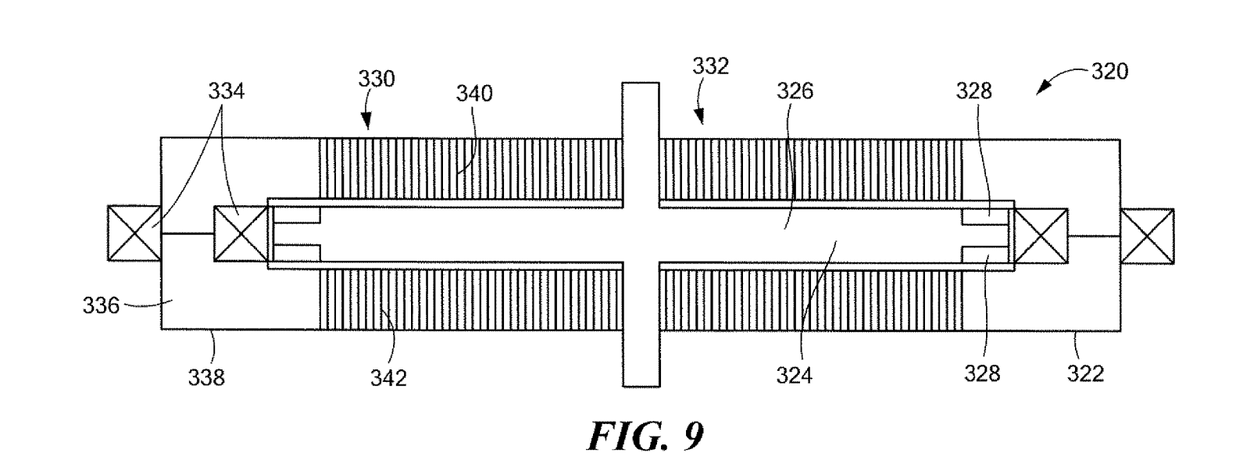
FIG. 9 is a cross sectional view of an electric motor.

Referring now to FIG. 9, there is shown a cross section of an electric motor 320. Motor 320 may be a transverse flux type motor having stator 322 and rotor 324. Rotor 324 has core 326 and magnets 328. Stator 322 has first and second stator segments or portions 330, 332 with each having similar features. Stator portion 330 has u shaped winding 334, upper stator ring 336 and lower stator ring 338. Upper stator ring 336 and lower stator ring 338 have teeth 340, 342 that are interleaved and offset with respect to each other.

Figure 10:
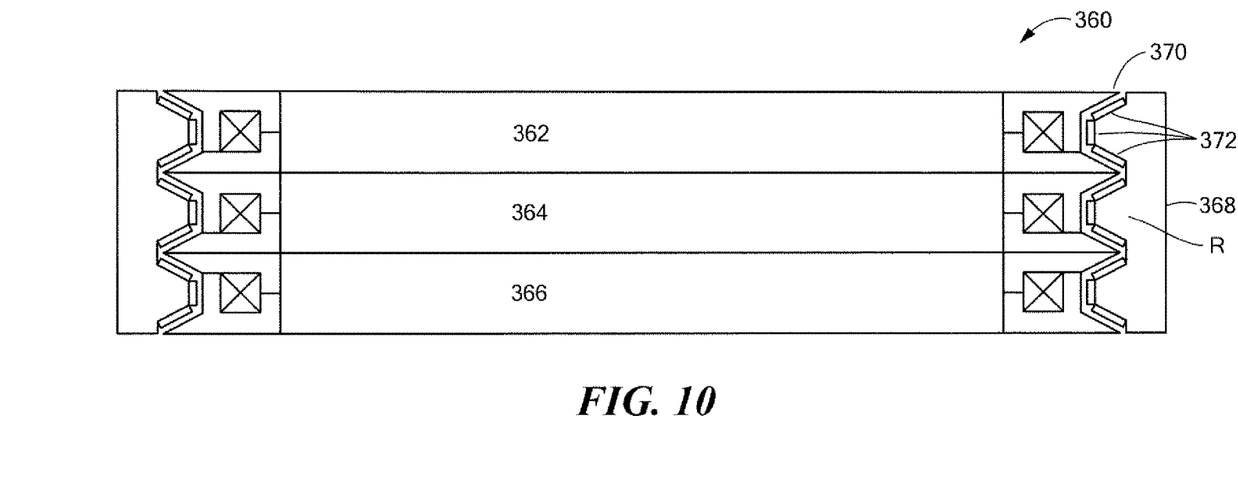
FIG. 10 is a cross sectional view of another electric motor.

Referring now to FIG. 10, there is shown a cross section of electric motor 360. Motor 360 may be a modified claw pole transverse flux motor. Motor 360 has 3 stators 362, 364, 366 and rotor 368. Stators 362, 364, 366 each represent a single phase of a three phase motor. The claw pole teeth 370 of the stators are extended to interact with additional magnets 372 on the rotor 368.

The disclosed embodiment is merely exemplary. Alternately, the combined axial and radial flux approach may be employed in any suitable motor type or in any suitable combination. For example, only a single axial magnetic path may be provided instead of two. By way of further example, a linear motor may be provided with stator features in a forcer and rotor features in a platen or otherwise. By way of further example, more or less phases may be provided. By way of further example, alternate motor topologies may be provided, such as any suitable commutated DC motor, any suitable asynchronous or synchronous AC motor or otherwise. By way of further example, any suitable combination of salient or distributed pole arrangements may be provided. By way of further example, the stator and/or rotor may be segmented into two or more phases. By way of further example, the rotor may be active (with magnet(s) and/or windings) or passive (solid core or without magnet(s) and/or windings). Similarly, the disclosed may be applied with the stator surrounding a rotor or alternately a rotor surrounding the stator. In addition, the disclosed embodiment may be applied to linear motor type drives, for example, AC, synchronous, brushed or otherwise. The disclosed may be used as a driving device or as a driven device, for example, a generator or otherwise. Similarly, the cooling topology may be applied to any soft magnetic material application, for example with respect to cooling transformer cores or other soft magnetic material application. Further, the disclosed embodiment may be used with any suitable winding geometry, for example, toroidal or other winding arrangements. In alternate aspects of the disclosed embodiment, lower power, for example, non-rare earth magnets may be provided to match or exceed performance of existing rare earth counterparts by utilizing the disclosed embodiment. As such all are embraced.

It should be seen that the foregoing description is only illustrative. Various alternatives and modifications can be devised by those skilled in the art. Accordingly, the present embodiment is intended to embrace all such alternatives, modifications, and variances.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

The invention claimed is:

1. A hybrid field electric motor comprising:
   a rotor with a rotor core rotating about a single axial axis and having a flat radial edge face and a flat sloping edge face on opposite sides of the flat radial edge face;
   a stator including a stator core and radial pole faces spaced by a gap from the radial edge face of the rotor for radially directing flux into the rotor core, wherein the gap spacing the stator core from the radial edge face of the rotor is a conical air gap, the stator further including a flat sloping pole face for each flat sloping edge face of the rotor core for flux directed into the rotor core at an angle between radial and axial; and
   wherein the flux directed from both the radial pole faces of the stator and the flat sloping pole faces of the stator cause the rotor to rotate about the single axial axis; and
   the rotor core and/or stator core made of a soft magnetic composite material having substantially isotropic magnetic behavior;
   wherein a central plane normal to the single axial axis extends through the stator and the rotor to allow a flux flow between the rotor and the stator across the conical air gap in a three-dimensional flux path such that the flux flow does not cross the central plane.

2. The motor of claim 1 in which the rotor is inside the stator and said rotor surface with at least one flat sloping edge face and a radial edge face are on an outer periphery of the rotor.

3. The motor of claim 1 in which the stator is inside the rotor and the rotor surface with at least one flat sloping edge face and a radial edge face are on an inner periphery of the rotor.

4. The motor of claim 1 in which the rotor includes a permanent magnet on said flat sloping edge face and said radial edge face.

5. The motor of claim 1 in which the stator radial pole faces are offset from the stator core.

6. The motor of claim 1 in which the stator includes windings configured as a salient pole hybrid field motor.

7. The motor of claim 1 in which the stator includes windings configured as a distributed pole hybrid field motor.

8. The motor of claim 1 further including cooling channels integrally formed within the soft magnet composite material.

9. The motor of claim 1 in which the motor defines a plurality of magnetic circuits each having more than one winding.

10. A hybrid field electric motor comprising:
    a rotor with a rotor core rotating about a single axial axis and having a flat radial edge face and a flat sloping edge face on opposite sides of the flat radial edge face;
    a stator including a stator core and radial pole faces spaced by a gap from the radial edge face of the rotor for radially directing flux into the rotor core, wherein the gap spacing the stator core from the radial edge face of the rotor is a conical air gap, the stator further including a flat sloping pole face for each flat sloping edge face of the rotor core for flux directed into the rotor core at an angle between radial and axial;
    wherein the flux directed from both the radial pole faces of the stator and the flat sloping pole faces of the stator cause the rotor to rotate about the single axial axis; and
    the rotor core and/or stator core made of a soft magnetic composite material having substantially isotropic magnetic behavior;
    wherein a central plane normal to the single axial axis extends through the stator and the rotor to allow a flux flow between the rotor and the stator across the conical air gap in a three-dimensional flux path such that the flux flow does not cross the central plane; and
    one or more cooling channels formed in the soft magnetic composite material.

11. The motor of claim 10 in which the rotor includes a flat permanent magnet on said sloping edge face and said radial edge face.

12. The motor of claim 10 in which the rotor includes a flat sloping edge face on each side of the radial edge face.

13. The motor of claim 12 in which the stator includes a flat sloping pole face for each sloping edge face of the rotor core.

14. A hybrid field electric motor comprising:
a rotor with a rotor core rotating about a single axial axis and having a flat radial edge face and a flat sloping edge face on opposite sides of the flat radial edge face;
a stator including a stator core and radial pole faces spaced by a gap from the radial edge face of the rotor for radially directing flux into the rotor core, wherein the gap spacing the stator core from the radial edge face of the rotor is a conical air gap, the stator further including a flat sloping pole face for each flat sloping edge face of the rotor core for flux directed into the rotor core at an angle between radial and axial; and
wherein the flux directed from both the radial pole faces of the stator and the flat sloping pole faces of the stator cause the rotor to rotate about the single axial axis; and
the rotor core and/or stator core made of a soft magnetic composite material having substantially isotropic magnetic behavior; and
a plurality of magnetic circuits each having more than one winding;
wherein a central plane normal to the single axial axis extends through the stator and the rotor to allow a flux flow between the rotor and the stator across the conical air gap in a three-dimensional flux path such that the flux flow does not cross the central plane.

15. The motor of claim 14 in which the rotor includes a flat permanent magnet on said sloping edge face and said radial edge face.

16. The motor of claim 14 in which the rotor includes a flat sloping edge face on opposite sides of the radial edge face.

17. The motor of claim 16 in which the stator includes a flat sloping pole face for each sloping edge face of the rotor core.

18. The motor of claim 14 further including cooling channels integrally formed within the soft magnet composite material.

* * * * *